S. F. MILLARD.
PROTECTOR FOR PNEUMATIC TIRES.
APPLICATION FILED JUNE 29, 1918.
1,288,109.
Patented Dec. 17, 1918.
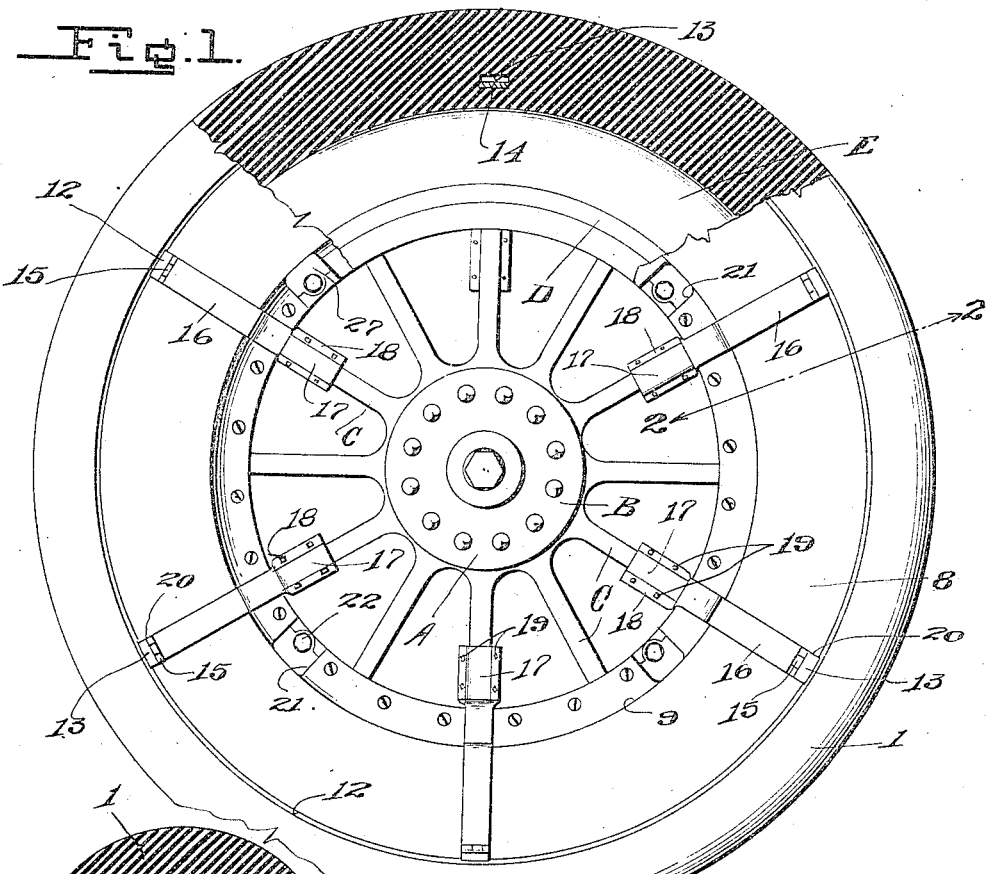
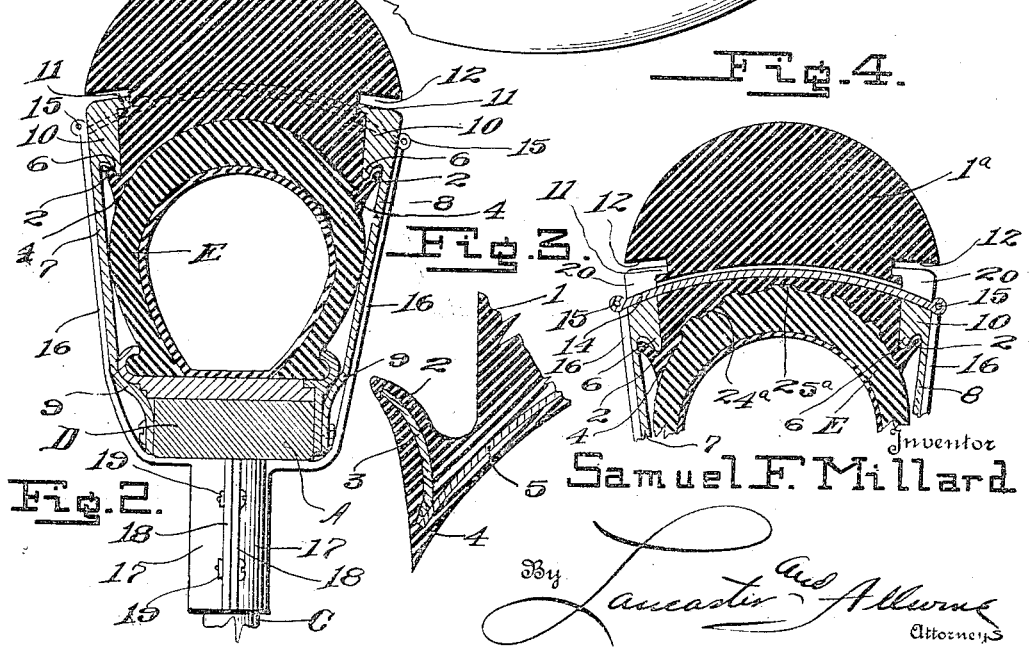

UNITED STATES PATENT OFFICE.

SAMUEL F. MILLARD, OF NORWALK, CONNECTICUT.

PROTECTOR FOR PNEUMATIC TIRES.

1,288,109.    Specification of Letters Patent.    Patented Dec. 17, 1918.

Application filed June 29, 1918. Serial No. 242,571.

*To all whom it may concern:*

Be it known that I, SAMUEL F. MILLARD, a citizen of the United States, and a resident of Norwalk, in the county of Fairfield and State of Connecticut, have invented certain new and useful Improvements in Protectors for Pneumatic Tires, of which the following is a specification.

This invention relates to a protector for ordinary pneumatic tires, and an object of the invention is to provide a resilient protector which is adapted to be mounted about the tread portion of an ordinary pneumatic tire, for protecting the tire and eliminating many of the undesirable conditions contingent with the use of pneumatic tires, such as punctures, blow-outs or the like, and further to provide a tire protector which will in no way detract from the resilient shock absorbing proclivities of a pneumatic tire.

Another object of the invention is to provide a tire protector, which may be conveniently attached to any ordinary type of vehicle wheel, carrying pneumatic tires, in such manner as to permit of limited radial movement of portions of the protector independently of its attaching means, and also to provide attaching means which forms a dust casing for the tire, preventing the accumulation of dust or other foreign material within the attaching means and about the ordinary pneumatic tire.

A further object of the invention is to provide a protecting tread structure for pneumatic tires, which will effectively support the load, should the ordinary pneumatic tire become deflated or flaccid for any reason.

Other objects of the invention will appear in the following detailed description, taken in connection with the accompanying drawings, forming a part of this specification, and in which drawings:

Figure 1 is a side elevation of a motor vehicle wheel showing the improved protector applied thereto, and also showing part of the protector in section.

Fig. 2 is a cross section through the tire and protector taken on the line 2—2 of Fig. 1.

Fig. 3 is an enlarged fragmentary section through a part of the protector structure showing the manner of reinforcing portions thereof.

Fig. 4 is a fragmentary section through a modified form of the protectve tread.

Referring more particularly to the drawings, A indicates an ordinary motor vehicle wheel, including the usual hub structure B, and radiating spokes C which are connected to the rim structure D, carrying the ordinary type of pneumatic tire E.

The protective tread structure, includes the annular tread member 1 which is constructed of resilient material, preferably solid rubber, and extends entirely about the tread portion of the tire E, having its outer surface rounded, as clearly shown in Figs. 2 and 4 of the drawings. The inner surface of the resilient protecting tread 1 is concavely cut to snugly fit the tread portion of the tire E.

The protecting tread 1 has annular outwardly curving flanges 2 formed thereon, which flanges are reinforced by metal plates 3 embedded therein while the relatively thin pointed portion 4 of the tread 1 is also reinforced by arcuate reinforcing plates 5 which also may be of metal and are embedded therein near the inner surface of the protective tread, as clearly shown in Fig. 3 of the drawings.

The outwardly curving attaching flanges 2, are engaged by the depending inwardly extending annular flanges 6 formed upon the attaching plates 7 and 8. The attaching plates 7 and 8, are circular, having their inner edges bent inwardly as shown at 9, to snugly fit about the rim structure D of the wheel A, to which they are attached, in any suitable manner. The outer edges of the plates 7 and 8 are increased in thickness, as clearly shown at 10, and the inner edges of these thickened portions are provided with annular recesses, which receive the flanges 2, whereby the plates will be locked or connected to the tread 1 by the interlocking engagement between the annular outwardly curving flanges 2 of the tread and the inwardly extending flanges 6 of the attaching plates. The enlarged portions 10 of the protecting and attaching plates 7 and 8 have inwardly extending annular flanges 11 formed upon their outer ends, which flanges, together with the heads engage in annular recesses 12 formed in the tread, so that these flanges co-act with the interlocking flanges 6 and 2 for securely connecting the tread member to the plates 7 and 8.

The annular recesses 12 are larger than the thickness of the flanges 11 so as to permit limited resilient movement of the tread portion of the tread 1 without movement of the plates 7 and 8. The plates 7 and 8 besides forming means for connecting the tread 1 to the tire E also form dust plates to prevent the accumulation of dust or other foreign material about the tire E within these plates, and between the engaging portions and interlocking portions of the plates and tread and the tread of the tire.

The resilient protective tread 1 is provided with transversely extending openings 13, at spaced intervals about the circumference of the same through which openings strips 14 of sheet metal extend. The strips 14 have their outer ends hinged as shown at 15 to metal straps 16. The metal straps 16 extend along and fit snugly against the outer surfaces of the plates 7 and 8 and they have their lower ends bent inwardly to fit about the wheel rim D, as clearly shown in Fig. 2 of the drawings. Each of the straps 16 has a substantially semi-cylindrical portion 17 formed upon its lower end, which fits about the spokes C of the wheel structure A. The semi-cylindrical enlargements 17 are connected by means of outwardly projecting flanges 18 formed thereon and bolts or other analogous attaching means 19 to securely attach the straps 16 to the spokes C of the wheel. The upper ends of the semi-cylindrical portions 17 and the adjacent portions of the straps 16 fit snugly against the under or inner surface of the wheel rim D, to prevent outward movement of these straps, and also of the strips 14 with respect to the wheel structure. The transverse openings 13 through which the strips 14 extend are wider than the thickness of the strips 14, so as to permit limited play of the tread with respect thereto. The strips 14 extend through cut-out portions 20 formed in the thickened portions 10 of the plates 7 and 8. The inner portions of the plates 7 and 8, which are bent inwardly to fit against the rim D are provided with cut-out portions 21, which receive therein the nuts 22 used for attaching the demountable rim structure and also the tire E to the wheel A.

In Fig. 4 of the drawings, a slight modification of the tread structure is shown. This tread 1ª, is provided with recesses 24ª in its inner surface adapted to receive and snugly fit about peripheral anti-skid projections 25ª upon the tire E. In all other respects, the form 1ª is identical with the form 1 illustrated in Figs. 1, 2 and 3 of the drawings.

From the foregoing description, taken in connection with the drawings, it will be readily apparent that a resilient protecting tread has been provided for pneumatic tires, which will eliminate many of the inconveniences contingent with the use of ordinary pneumatic tires, and one which will, in case the pneumatic tire should become flaccid or deflated for any purpose, absorb the shocks incidental to the use of the tire, and one which may be attached to any ordinary vehicle wheel which carries pneumatic tires, without alteration of the wheel structure.

Changes in details may be made without departing from the spirit or scope of this invention; but,

I claim:

1. The combination with an ordinary pneumatic tire and carrying wheel therefor, of a resilient protecting tread mounted about the tread portion of the tire and having annular outwardly extending flanges formed on its edges, and means engaging said flanges and inclosing the tire for connecting the resilient protecting tread to said wheel structure.

2. The combination with an ordinary pneumatic tire and the carrying wheel therefor, of a resilient protecting tread mounted about the tread portion of the tire, means inclosing the tire and detachably connected to the wheel structure for holding the tread mounted about the tire, said means being connected to the resilient protecting tread to permit limited yielding movement thereof independently of movement of the attaching means.

3. The combination with an ordinary pneumatic tire and carrying wheel therefor, of a relatively thick resilient protecting tread mounted about the tread portion of the tire, outwardly extending annular flanges formed upon the inner edges of said tread, a pair of circular plates attached to the carrying wheel upon each side of the tire and inclosing the side portion of the latter, inwardly extending flanges formed upon said plates and positioned in interlocking engagement with said tread carried flanges for connecting the tread to the carrying wheel.

4. The combination with an ordinary pneumatic tire and carrying wheel therefor, of a resilient protecting tread mounted about the tread portion of the tire, outwardly extending annular flanges formed upon the inner edges of said tread, a pair of circular plates attached to the carrying wheel upon each side of the tire, inwardly extending flanges formed upon said plates and positioned in interlocking engagement with said tread carried flanges for connecting the tread to the carrying wheel, said tread provided with transversely extending passageways spaced circumferentially about the same, metal strips extending through said passageways, and spoke carried straps hingedly connected to the ends of said strips.

5. The combination with an ordinary pneumatic tire and carrying wheel therefor, of a resilient protecting tread mounted about the tread portion of the tire, outwardly extending annular flanges formed upon the inner edges of said tread, a pair of circular plates attached to the carrying wheel upon each side of the tire, inwardly extending flanges formed upon said plates and positioned in interlocking engagement with said tread carried flanges for connecting the tread to the carrying wheel, said tread provided with transversely extending passageways spaced circumferentially about the same, metal strips extending through said passageways, spoke carried straps hingedly connected to the ends of said strips, said passageways being of greater depth than the thickness of said metal strips to permit limited movement of the strips with respect to the tread.

6. The combination with an ordinary pneumatic tire, and carrying wheel therefor, of a protecting tread of resilient material mounted about the tread portion of a pneumatic tire, said tread provided with a plurality of circumferentially spaced transverse passageways extending therethrough, strips seated in said passageways and projecting beyond the sides of the tread, spoke carried straps hingedly connected to the ends of said strips and adapted to be connected to the spokes of the carrying wheel.

7. The combination with an ordinary pneumatic tire and the carrying wheel therefor, of a resilient protecting tread mounted about the tread portion of the tire, outwardly extending annular flanges formed about the inner edges of said tread, said tread provided with recesses extending inwardly from each side thereof, attaching plates detachably attached to said carrying wheel and provided with means for engaging said flanges to connect the plates to the tread, inwardly extending flanges formed upon the outer ends of said plates and extending into said recesses, said flanges being thinner than the said recesses.

8. The combination with an ordinary pneumatic tire and carrying wheel therefor, of a resilient protecting tread mounted about the tread portion of the tire, outwardly extending annular flanges formed upon the inner edges of said tread, said tread provided with recesses extending inwardly from its opposite sides, attaching plates attached to the carrying wheel and having their outer edges thickened, inwardly extending flanges formed upon said thickened edges and interlocking with said outwardly extending tread carried flanges, and inwardly extending flanges formed upon the outer ends of said thickened portions and seated in said tread carried recesses.

9. The combination with an ordinary pneumatic tire and carrying wheel therefor, of a resilient protecting tread mounted about the tread portion of the tire, outwardly extending annular flanges formed upon the inner edges of said tread, said tread provided with recesses extending inwardly from its opposite sides, attaching plates attached to the carrying wheel and having their outer edges thickened, inwardly extending flanges formed upon said thickened edges and interlocking with said outwardly extending tread carried flanges, inwardly extending flanges formed upon the outer ends of said thickened portions and seated in said tread carried recesses, said tread provided with circumferentially spaced transversely extending openings formed therein slightly inwardly of said recesses, said thickened portions provided with cut-out portions alining with said transverse passageways, and attaching strips extending through said passageways and seated in the cut-out portions in the thickened portions of said plates.

10. The combination with an ordinary pneumatic tire and carrying wheel therefor, of a resilient protecting tread mounted about the tread portion of the tire, outwardly extending annular flanges formed upon the inner edges of said tread, said tread provided with recesses extending inwardly from its opposite sides, attaching plates attached to the carrying wheel and having their outer edges thickened, inwardly extending flanges formed upon said thickened edges and interlocking with said outwardly extending tread carried flanges, inwardly extending flanges formed upon the outer ends of said thickened portions and seated in said tread carried recesses, said tread provided with circumferentially spaced transversely extending openings formed therein slightly inwardly of said recesses, said thickened portions provided with cut-out portions alining with said transverse passageways, attaching strips extending through said passageways and seated in the cut-out portions in the thickened portions of said plates, and straps hingedly connected to the outer ends of said attaching strips, said straps having spoke engaging portions formed upon their inner ends for engagement with certain spokes of the carrying wheel.

11. The combination with an ordinary pneumatic tire and carrying wheel therefor, of a resilient protecting tread mounted about the tread portion of the tire, and metallic attaching means inclosing the side portion of the tire and connecting the resilient protecting tread to said wheel structure, said metallic attaching means connected to said tread to permit limited movement of one with respect to the other, and means connected to said tread and wheel structure and engaging said attaching members to prevent lateral displacement of the outer edge portions of the attaching members with respect to the tread.

SAMUEL F. MILLARD.